(12) United States Patent
Feichtinger et al.

(10) Patent No.: US 8,693,164 B2
(45) Date of Patent: Apr. 8, 2014

(54) ELECTRICAL MULTI-LAYERED COMPONENT AND CIRCUIT ARRANGEMENT COMPRISING THE SAME

(75) Inventors: Thomas Feichtinger, Graz (AT); Georg Krenn, Graz (AT)

(73) Assignee: Epcos AG, Munich (DE)

( * ) Notice: Subject to any disclaimer, the term of this patent is extended or adjusted under 35 U.S.C. 154(b) by 82 days.

(21) Appl. No.: 13/139,166

(22) PCT Filed: Dec. 10, 2009

(86) PCT No.: PCT/EP2009/066855
§ 371 (c)(1),
(2), (4) Date: Aug. 25, 2011

(87) PCT Pub. No.: WO2010/066848
PCT Pub. Date: Jun. 17, 2010

(65) Prior Publication Data
US 2011/0299220 A1    Dec. 8, 2011

(30) Foreign Application Priority Data
Dec. 12, 2008   (DE) .................. 10 2008 062 023

(51) Int. Cl.
*H01G 4/30*   (2006.01)
(52) U.S. Cl.
USPC ............ 361/301.4; 361/301.2; 361/311; 361/313; 361/321.2; 361/306.1
(58) Field of Classification Search
USPC ........... 361/301.4, 311–313, 303–305, 306.1, 361/306.3
See application file for complete search history.

(56) References Cited

U.S. PATENT DOCUMENTS

| | | | |
|---|---|---|---|
| 6,377,439 B1 * | 4/2002 | Sekidou et al. | 361/303 |
| 7,359,178 B2 * | 4/2008 | Feichtinger | 361/306.3 |
| 2003/0129957 A1 | 7/2003 | Shingaki et al. | |
| 2006/0209492 A1 | 9/2006 | Togashi | |
| 2006/0221545 A1 | 10/2006 | Togashi | |
| 2008/0135466 A1 | 6/2008 | Kim | |
| 2010/0109804 A1 | 5/2010 | Feichtinger | |

FOREIGN PATENT DOCUMENTS

| | | |
|---|---|---|
| DE | 102 24 565 A1 | 12/2003 |
| DE | 10 2007 020 783 A1 | 11/2008 |
| JP | 58-132903 A | 8/1983 |
| JP | 63-146422 A | 6/1988 |
| JP | 03-131008 A | 6/1991 |
| JP | 2000-003804 A | 1/2000 |
| JP | 2000-049058 A | 2/2000 |
| JP | 2000-195742 A | 7/2000 |

(Continued)

*Primary Examiner* — Nguyen T Ha
(74) *Attorney, Agent, or Firm* — Slater & Matsil, L.L.P.

(57) ABSTRACT

An electrical multi-layered component includes a monolithic base member that has a plurality of ceramic layers and electrode layers disposed one on top of the other in alternating fashion. The base member includes two end surfaces opposite to one another and two side surfaces opposite to one another. The multi-layered component includes a plurality of external electrodes and a plurality of internal electrodes designed into the electrode layers. The internal electrodes at least partially overlap and form overlap areas. Each internal electrode is associated with a respective external electrode. At least one first internal electrode extending from an end surface overlaps with at least one second internal electrode (8) extending from an opposite end surface. At least a third internal electrode extends from an end surface. The third internal electrode overlapping with the first and the second internal electrode

19 Claims, 9 Drawing Sheets

(56) References Cited

FOREIGN PATENT DOCUMENTS

| | | |
|---|---|---|
| JP | 2000-1957425 A | 7/2000 |
| JP | 2001-210544 A | 8/2001 |
| JP | 2005-142587 A | 6/2005 |
| JP | 2006-147793 A | 6/2006 |
| JP | 2006-286731 A | 10/2006 |

* cited by examiner

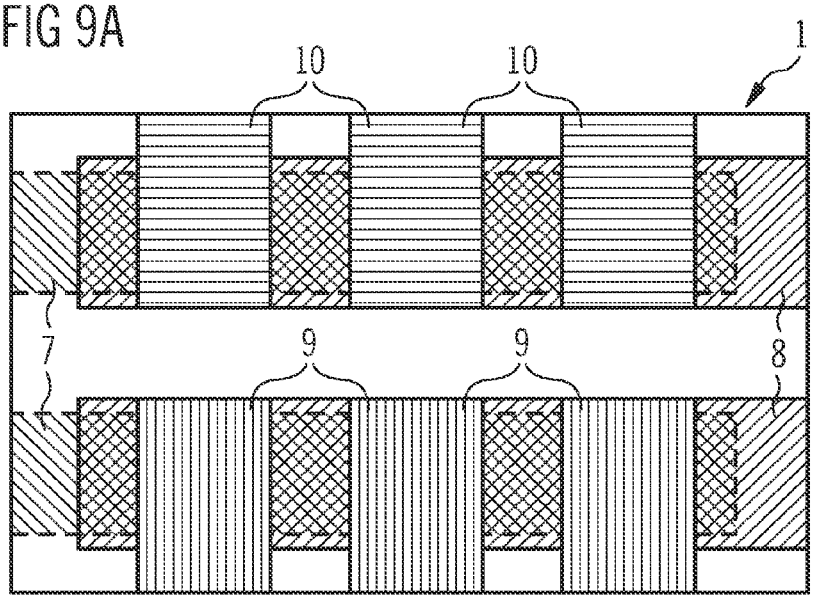
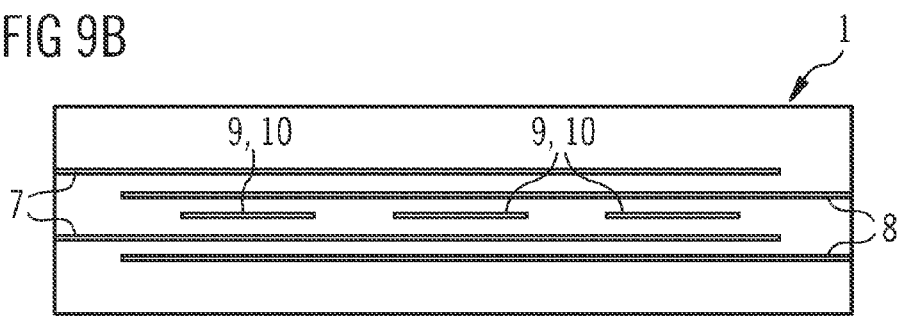
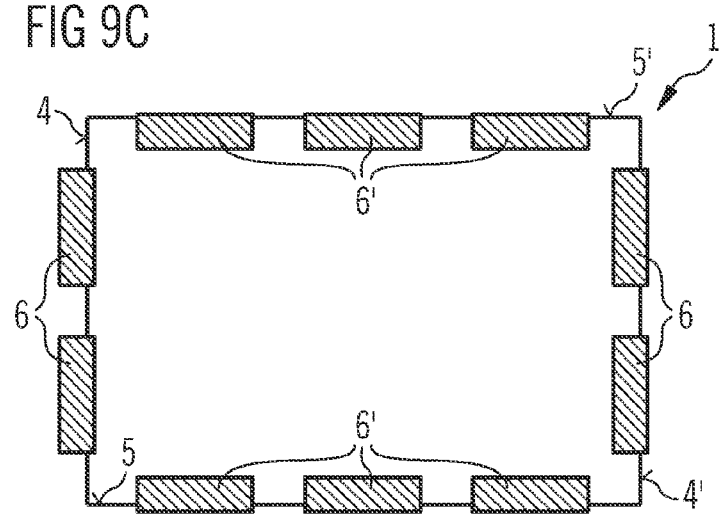

ELECTRICAL MULTI-LAYERED COMPONENT AND CIRCUIT ARRANGEMENT COMPRISING THE SAME

This patent application is a national phase filing under section 371 of PCT/EP2009/066855, filed Dec. 10, 2009, which claims the priority of German patent application 10 2008 062 023.8, filed Dec. 12, 2008, each of which is incorporated herein by reference in its entirety.

BACKGROUND

An electrical multi-layered component is known from the German patent publication DE 10 2007 020 783 A1.

SUMMARY OF THE INVENTION

One aspect of the invention specifies an electrical multi-layered component which can be produced in a simple manner and which has a high integration density. Further aspects specify a circuit arrangement comprising the electrical multi-layered component.

An electrical multi-layered component comprising a monolithic base body is specified, comprising a plurality of ceramic layers and electrode layers arranged alternately one above another. The base body has two end surfaces lying opposite one another and two side surfaces lying opposite one another. The multi-layered component has a plurality of external electrodes. A plurality of internal electrodes are embodied in the electrode layers, wherein the internal electrodes at least partly overlap and form overlap regions. Each internal electrode is assigned a respective external electrode. At least one first internal electrode proceeding from an end surface overlaps at least one second internal electrode proceeding from an opposite end surface. At least one third internal electrode proceeds from a side surface, the at least one third internal electrode overlapping the first and second internal electrodes.

The first and the second internal electrode of the electrical multi-layered component delimit a first electrical functional unit in the overlap region.

A third internal electrode overlaps the first and second internal electrodes and forms in the overlap region together with a ceramic layer a second electrical functional unit.

In one embodiment, the electrical multi-layered component has a fourth internal electrode proceeding from a side surface. The fourth internal electrode at least partly overlaps at least one of the first and second internal electrodes and forms together with a ceramic layer a third electrical functional unit.

The functional units of the electrical multi-layered component are preferably independent of one another for the most part.

In one embodiment, the third and the fourth internal electrodes are arranged in the same electrode layer.

The third and the fourth internal electrodes are preferably arranged such that they have no edge effects among one another.

In one embodiment, the third and the fourth internal electrodes are arranged in the same electrode layer and spaced apart from one another to such an extent that no desired edge effect occurs between the third and fourth electrodes, such that at least approximately no electrical functional unit is formed.

In one embodiment, the first and second internal electrodes are respectively connected to an external electrode, which are arranged on opposite side surfaces of the base body.

In a further embodiment, the third and fourth internal electrodes are respectively connected to an external electrode, which are arranged on opposite side surfaces of the base body.

In one embodiment, wherein the electrical multi-layered component comprises one first, one second and one third internal electrode, the electrical multi-layered component can have an external electrode on both side surfaces of the base body, but one of the external electrodes at the side surfaces has no direct electrical connection to one of the internal electrodes. For reasons of symmetry or for simple production, it can be advantageous if the electrical multi-layered component has a respective external electrode on the opposite side surfaces.

In one embodiment, the electrical multi-layered component has, in the case of n external electrodes, where n is an integer greater than 2, precisely n−1 electrical functional units.

In a further embodiment, the electrical multi-layered component preferably has a symmetrical arrangement of internal electrodes along a longitudinal axis of the base body. The two symmetrical partial regions of the multi-layered component each have, in the case of n external electrodes, precisely n−1 electrical functional units. The two partial regions of the electrical multi-layered component therefore together have, in the case of n external electrodes, where n is an integer greater than 2, precisely n−2 electrical functional units.

In one embodiment, an electrical functional unit of the multi-layered component has the function of a capacitor or a varistor. In a further embodiment, it is also possible for both a capacitor and a varistor, or a plurality of varistors or capacitors to be arranged in an electrical multi-layered component.

In one embodiment, the electrical multi-layered component has a plurality of capacitors having different capacitances.

In a further embodiment, the multi-layered component has a plurality of varistors having different varistor voltages. However, it is also possible for the electrical multi-layered component to have a plurality of capacitors and varistors having in each case different capacitances and different varistor voltages, respectively.

In one embodiment of the multi-layered component described above, the ceramic layer comprises a varistor ceramic and/or a capacitor ceramic.

The varistor ceramic of the electrical multi-layered component, preferably comprises zinc oxide bismuth antimony (ZnO—BiSb) or zinc oxide praseodymium (ZnPr).

In one embodiment, the electrical multi-layered component has a symmetrical arrangement, wherein each of the partial arrangements comprises the construction of a multi-layered component described above, wherein the external electrodes are preferably embodied with respect to the two end surfaces and with respect to one of the side surfaces. In this case, the partial arrangement of the symmetrical multi-layered component comprises first and second internal electrodes, which make contact with the external electrodes arranged at the end sides, and also one or a plurality of third and/or fourth internal electrodes which overlap the first and second internal electrodes and are electrically connected to external electrodes at one of the side surfaces.

For interconnecting a multi-layered component described above in a circuit arrangement, at least one of the external electrodes arranged at the end sides is connected to ground. At least one of the external electrodes arranged at the end sides is connected to a voltage-carrying line. The further external electrodes arranged at the side surfaces of the electrical multi-layered component are preferably connected to signal lines.

BRIEF DESCRIPTION OF THE DRAWINGS

The above-described subjects and the arrangement are explained in greater detail with reference to the following figures and exemplary embodiments.

The drawings described below should not be regarded as true to scale; rather, the illustrations can be illustrated in a manner enlarged, reduced or else distorted in individual dimensions. Elements which are identical to one another or which perform the same function are designated by the same reference symbols.

FIG. 9A schematically shows the construction of the internal electrodes of a further exemplary embodiment of the electrical multi-layered component comprising two symmetrical subunits;

FIG. 9B shows a cross section through an electrical multi-layered component comprising an internal electrode arrangement in accordance with FIG. 9A;

FIG. 9C shows the arrangement of the external electrodes in accordance with the exemplary embodiment of an electrical multi-layered component according to FIGS. [9A and 9B.

Figure 1A:
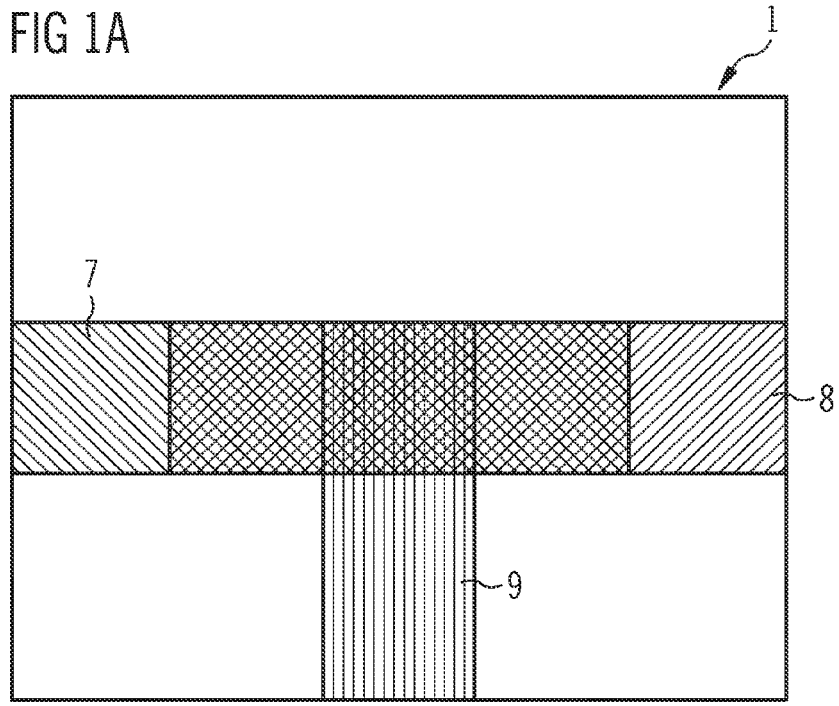
FIG. 1A shows a schematic construction of the internal electrodes of a first exemplary embodiment of an electrical multi-layered component comprising three internal electrodes.

The following list of reference symbols may be used in conjunction with the drawings:
1 Base body
2 Ceramic layer
3 Electrode layer
4, 4' End surface
5, 5' Side surface
6, 6' External electrode
7 First internal electrode
8 Second internal electrode
9 Third internal electrode
10 Fourth internal electrode
11 First functional unit
12 Second functional unit
13 Third functional unit
14 Varistor
15 Voltage-carrying line
16 Ground

DETAILED DESCRIPTION OF ILLUSTRATIVE EMBODIMENTS

FIG. 1A shows a schematic construction of the internal electrode arrangement of an electrical multi-layered component. The multi-layered component has a base body 1, wherein a first internal electrode 7 and a second internal electrode 8 are arranged in such a way that they overlap one another in plan view. The electrical multi-layered component has a third internal electrode 9, which has an overlap region with the first 7 and second 8 internal electrodes of the multi-layered component.

Figure 1B:
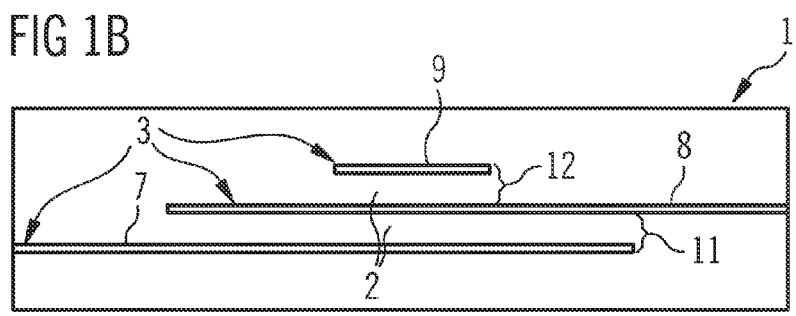
FIG. 1B shows a cross section through the electrical multi-layered component in accordance with FIG. 1A.

FIG. 1B illustrates a cross section through a multi-layered component in accordance with the arrangement of the internal electrodes 7, 8, 9 according to FIG. 1A. The electrical multi-layered component has a base body 1. The multi-layered component has a plurality of ceramic layers 2 and a plurality of electrode layers 3. A first 7 and a second 8 internal electrode are arranged one above another in different electrode layers. The first 7 and the second 8 internal electrodes form, in the overlap region with a ceramic layer lying in between, a first electrical functional unit 11. A third internal electrode 9 overlaps the first 7 and second 8 internal electrodes and forms with the ceramic layer a second functional unit 12. The electrode layers 3 are formed by the internal electrodes 7, 8 and 9.

Figure 2:
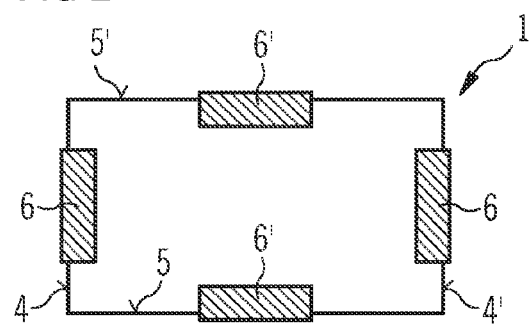
FIG. 2 shows the arrangement of external electrodes of one embodiment of an electrical multi-layered component.

FIG. 2 schematically shows the arrangement of external electrodes 6, 6' at a base body 1 of an electrical multi-layered component. The electrical multi-layered component exhibits an embodiment comprising four external electrodes 6, 6', wherein two external electrodes 6 are arranged at the end sides 4, 4' of the base body 1. A respective further external electrode 6' is arranged at two opposite side surfaces 5, 5' of the base body 1.

In accordance with the embodiments in FIGS. 1A and 1B of the electrical multi-layered component, the external electrodes 6, 6' can be arranged as in FIG. 2, but in this case one of the external electrodes 6' is not connected up or is not connected to one of the internal electrodes 7, 8 and 9 of the electrical multi-layered component. The first 7 and second 8 internal electrodes of the electrical multi-layered component are preferably electrically connected to the external electrodes 6 arranged at the end sides. The third internal electrode 9 is preferably connected to an external electrode 6' arranged at the side surfaces of the base body 1.

Figure 3A:
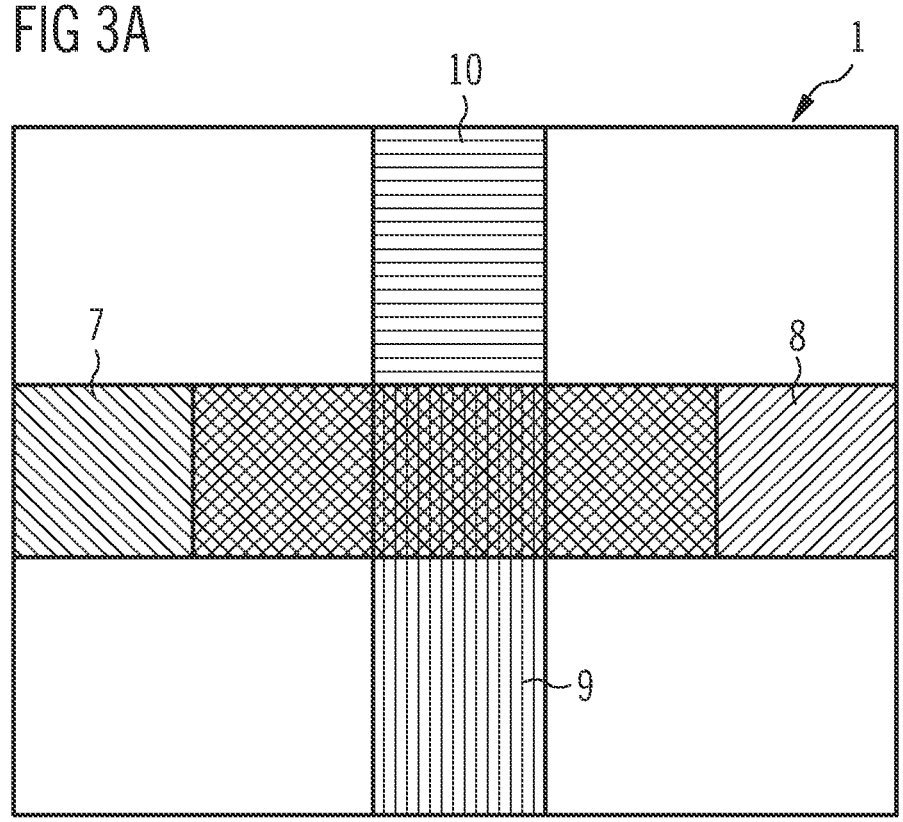
FIG. 3A schematically shows the construction of the internal electrodes of a further exemplary embodiment of the electrical multi-layered component comprising four internal electrodes.
Figure 3B:
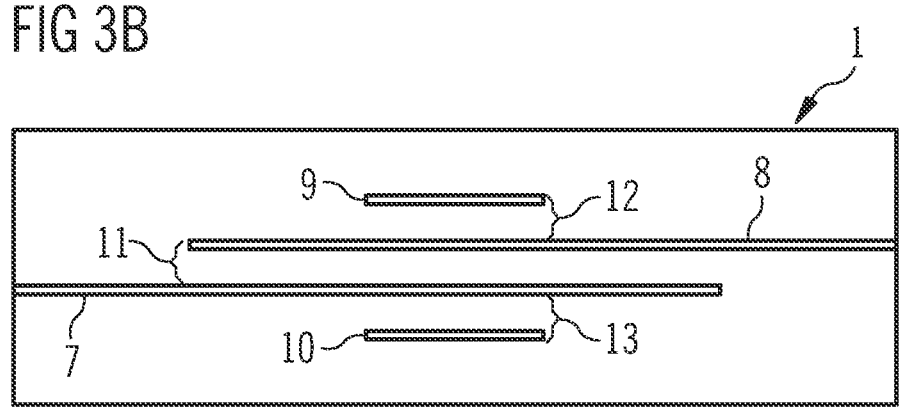
FIG. 3B shows a cross section through an electrical multi-layered component comprising an internal electrode arrangement in accordance with FIG. 3A.

FIG. 3a shows a schematic construction of the internal electrodes of a further embodiment of the electrical multi-layered component. The electrical multi-layered component has a base body 1. A first 7 and a second 8 internal electrode partly overlap one another and form in the overlap region a first electrical functional unit 11, which is illustrated in FIG. 3B. The electrical multi-layered component has a third internal electrode 9 and a fourth internal electrode 10, which respectively have an overlap region with the first 7 and second 8 internal electrodes and form a second 12 and third 13 electrical functional units, which are illustrated in FIG. 3B.

FIG. 3B schematically illustrates a cross section of an electrical multi-layered component in accordance with the embodiment according to FIG. 3A. The multi-layered component has a base body 1 having a first 7 and a second 8 internal electrode, which overlap one another and form a first electrical functional unit 11. A third 9 and fourth 10 internal electrode overlap the first 7 and second 8 internal electrodes and form a second 12 and third 13 electrical functional unit. The electrical multi-layered component in accordance with the embodiments of FIGS. 3A and 3B preferably has an arrangement of the external electrodes in accordance with the embodiment according to FIG. 2. In this case, all the external electrodes 6, 6' are directly connected to internal electrodes, wherein the first 7 and second 8 internal electrodes are contact-connected to the external electrodes 6 arranged at the end sides and the third 9 and respectively fourth 10 internal electrodes are connected to the external electrodes 6' at the side surfaces of the base body 1.

Figure 4A:
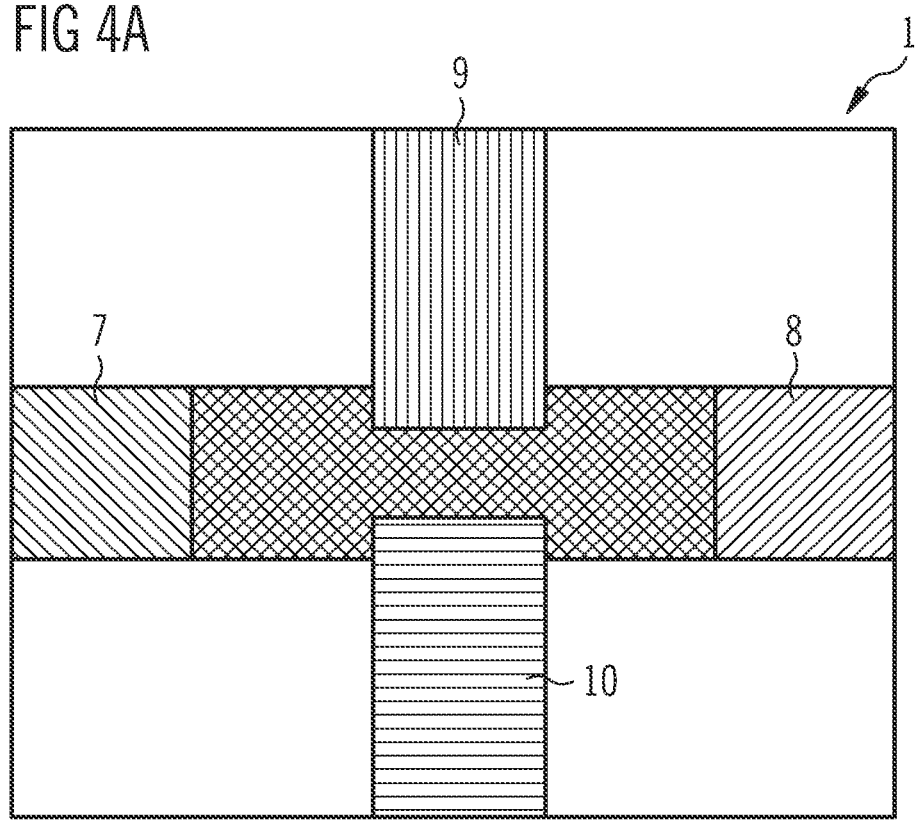
FIG. 4A schematically shows the construction of the internal electrodes of another exemplary embodiment of the multi-layered component comprising four internal electrodes.

FIG. 4A shows a further embodiment of the electrical multi-layered component, wherein the base body 1 has first 7 and second 8 internal electrodes. The first internal electrode 7 and the second internal electrode 8 overlap one another and delimit a first electrical functional unit 11. The embodiment of the electrical multi-layered component in accordance with FIG. 4A has a third 9 and fourth 10 internal electrode, which are arranged in the same electrode layer. The third 9 and fourth 10 internal electrodes overlap and with the first 7 and respectively second 8 internal electrodes and delimit further electrical functional units. The third 9 and fourth 10 internal electrodes are preferably arranged in such a way that with the first 7 and second 8 internal electrodes they delimit electrical functional units, but preferably form no electrical functional unit among one another.

Figure 4B:
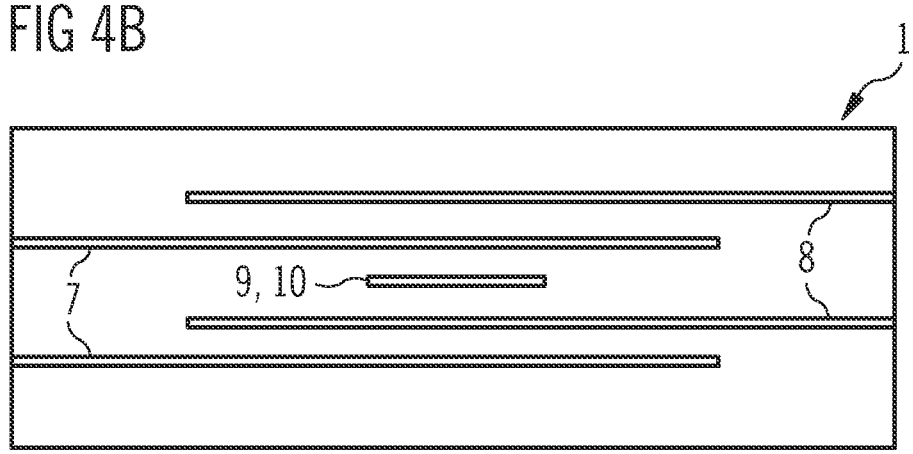
FIG. 4B shows a cross section through an electrical multi-layered component comprising an internal electrode arrangement in accordance with FIG. 4A.

FIG. 4B shows a cross section through an electrical multi-layered component in accordance with the internal electrode arrangement according to FIG. 4A. The electrical multi-layered component has a base body 1 having two first internal electrodes 7 and two second internal electrodes 8. The first 7 and second 8 internal electrodes respectively form pairs. A third 9 and a fourth 10 internal electrode are arranged between these two pairs of the first 7 and second 8 internal electrodes. The third 9 and the fourth 10 internal electrodes are arranged in the same electrode layer. The embodiment of the electrical multi-layered component in accordance with FIGS. 4A and 4B has, for example, an arrangement of the external electrodes in accordance with FIG. 2. In this case, the first 7 and second 8 internal electrodes are contact-connected to the external electrodes 6 arranged at the end sides. The third 9 and the fourth 10 internal electrode are connected to the external electrodes 6' arranged at the side surfaces of the base body 1 of the electrical multi-layered component.

Figure 5A:
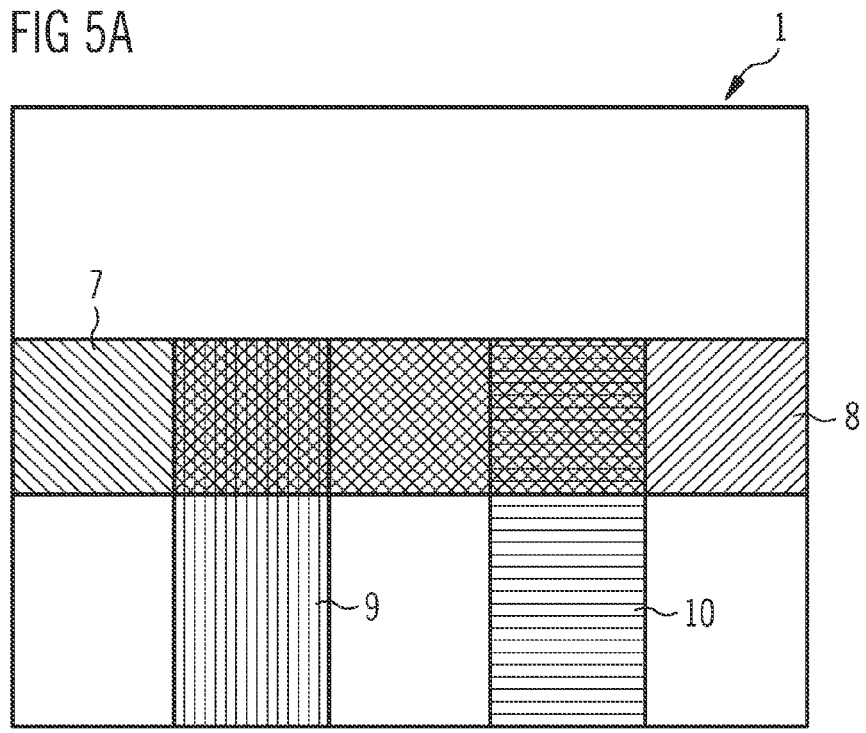
FIG. 5A schematically shows the construction of the internal electrodes of a third exemplary embodiment of the electrical multi-layered component comprising four internal electrodes.

FIG. 5A shows a further embodiment of the electrical multi-layered component, wherein the electrical multi-layered component has a base body 1, wherein a first 7 and second 8 internal electrode are arranged in such a way that they overlap one another and form a first electrical functional unit 11. The base body 1 of the electrical multi-layered component in accordance with the embodiment according to FIG. 5A has a third 9 and a fourth 10 internal electrode, which overlap the first 7 and second 8 internal electrodes and form further electrical functional units. In the embodiment illustrated, the third 9 and fourth 10 internal electrodes of the electrical multi-layered component are led to the same side surface of the base body 1.

Figure 5B:
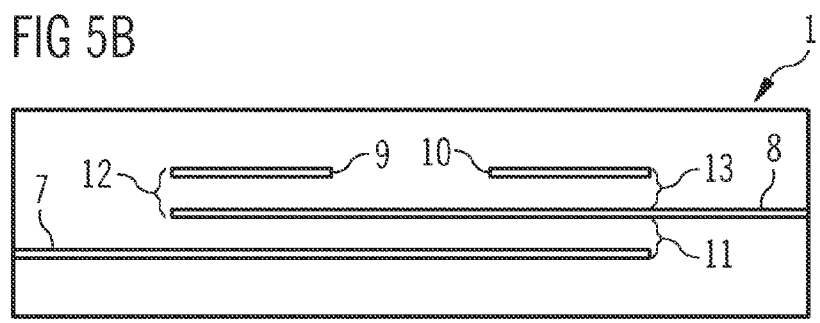
FIG. 5B shows a cross section through an electrical multi-layered component comprising an internal electrode arrangement in accordance with FIG. 5A.

FIG. 5B illustrates a cross section of the electrical multi-layered component in accordance with the embodiment in FIG. 5A. The electrical multi-layered component has a base body 1, wherein a plurality of internal electrodes 7, 8, 9, 10 are arranged in such a way that a first 7 and second 8 internal electrode overlap one another and delimit a first electrical functional unit 11. A third internal electrode 9 is arranged in such a way that it overlaps the first 7 and second 8 internal electrode and delimits a second electrical functional unit 12. The fourth internal electrode 10 of the electrical multi-layered component is likewise arranged in such a way that it overlaps the first 7 and second 8 internal electrodes and forms a third electrical functional unit 13. The third 9 and the fourth 10 internal electrode are arranged alongside one another in the same electrode layer.

Figure 5C:
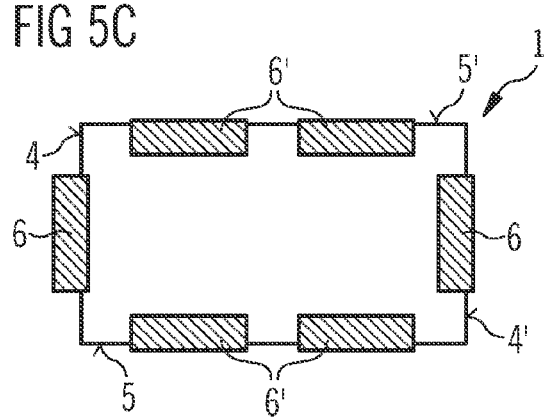
FIG. 5C shows the arrangement of the external electrodes in accordance with one exemplary embodiment of the electrical multi-layered component according to FIGS. 5A and 5B.

FIG. 5C shows the arrangement of the external electrodes 6, 6' at a base body 1 of an electrical multi-layered component. The electrical multi-layered component has at the end sides 4, 4' of the base body 1 a respective external electrode 6, which is respectively connected to the first 7 and the second 8 internal electrode of the electrical multi-layered component. The external electrodes 6' arranged at the side surfaces 5, 5' of the base body 1 are preferably connected to the third 9 and respectively fourth 10 internal electrodes of the electrical multi-layered component.

The embodiments of the electrical multi-layered component according to FIG. 5C exhibits in each case two external electrodes 6' at the side surfaces. The arrangement of the external electrodes 6, 6' for an electrical multi-layered component in accordance with the embodiment according to FIGS. 5A and 5B can be embodied in accordance with the embodiment illustrated in FIG. 5C. However, for the exemplary embodiment of the electrical multi-layered component as shown in FIG. 5A, it is not necessary for the external electrodes 6' to be arranged on opposite side surfaces of the base body 1. Two external electrodes 6' at a side surface of the base body 1 suffice for the embodiment in accordance with FIGS. 5A and 5B. The further external electrodes 6' at the opposite side surface are not connected up and are not connected to any of the internal electrodes. For reasons of symmetry or for the production of the electrical multi-layered component, however, it can be advantageous if the base body 1, as illustrated in FIG. 5C, has the external electrodes 6, 6' arranged symmetrically.

Figure 6A:
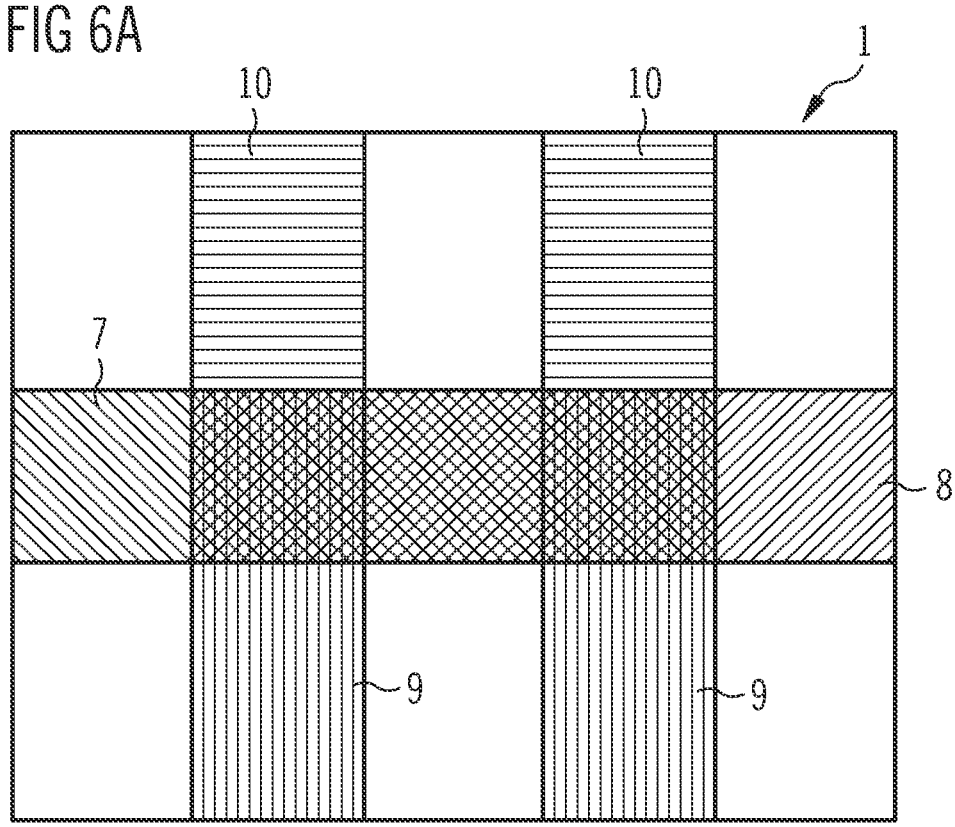
FIG. 6A schematically shows the construction of the internal electrodes of an exemplary embodiment of the electrical multi-layered component comprising six internal electrodes.

FIG. 6A shows a further embodiment of an electrical multi-layered component, wherein the electrical multi-layered component a base body 1, in which a first 7 and a second 8 internal electrode are arranged, which overlap one another.

The embodiment in accordance with FIG. 6A exhibits two third internal electrodes 9, which overlap the first 7 and the second 8 internal electrode and delimit electrical functional units. The electrical multi-layered component has two fourth internal electrodes 10, which likewise overlap the first and second internal electrodes 7, 8 and delimit further electrical functional units.

Figure 6B:
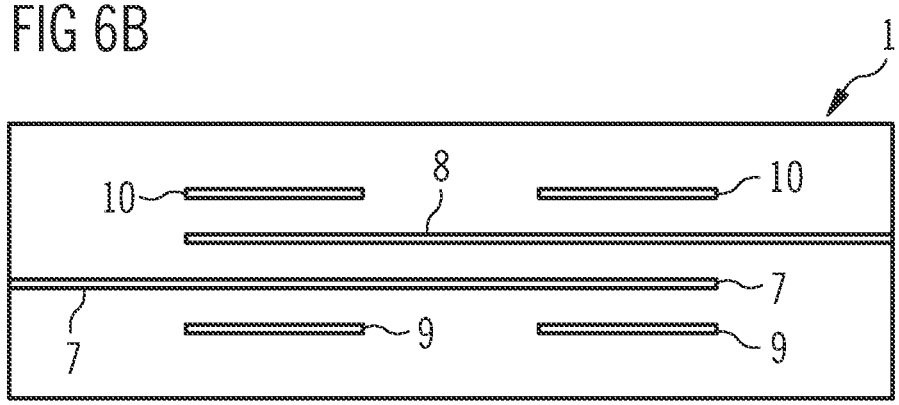
FIG. 6B shows a cross section through a multi-layered component comprising an internal electrode arrangement in accordance with FIG. 6A.

FIG. 6B illustrates a cross section through a multi-layered component in accordance with the internal electrode arrangement of the electrical multi-layered component according to FIG. 6A. The electrical multi-layered component has a base body 1, wherein a first 7 and second 8 internal electrode overlap one another and delimit a first electrical functional unit 11. Two third internal electrodes 9 of the electrical multi-layered component overlap the first 7 and second 8 internal electrodes and form in a composite assembly with the ceramic further electrical functional units. Two fourth internal electrodes 10 likewise overlap the first 7 and the second 8 internal electrode and form further electrical functional units. The third 9 and the fourth 10 internal electrodes are in each case arranged in different electrode layers, above and respectively below the first 7 and the second 8 internal electrode.

The arrangement of the external electrodes in accordance with the exemplary embodiment of the electrical multi-layered component according to FIGS. 6A and 6B is preferably embodied in accordance with the embodiment of FIG. 5C, wherein the first and the second internal electrode of the electrical multi-layered component are connected to the external electrodes 6 arranged at the end sides. The third 9 and fourth 10 internal electrodes of the electrical multi-layered component are connected to the external electrodes 6' arranged at the side surfaces of the base body 1. In accordance with the embodiments according to FIGS. 6A, 6b, therefore, all the external electrodes 6, 6' of the electrical multi-layered component are connected to internal electrodes according to FIG. 5C.

Figure 7A:
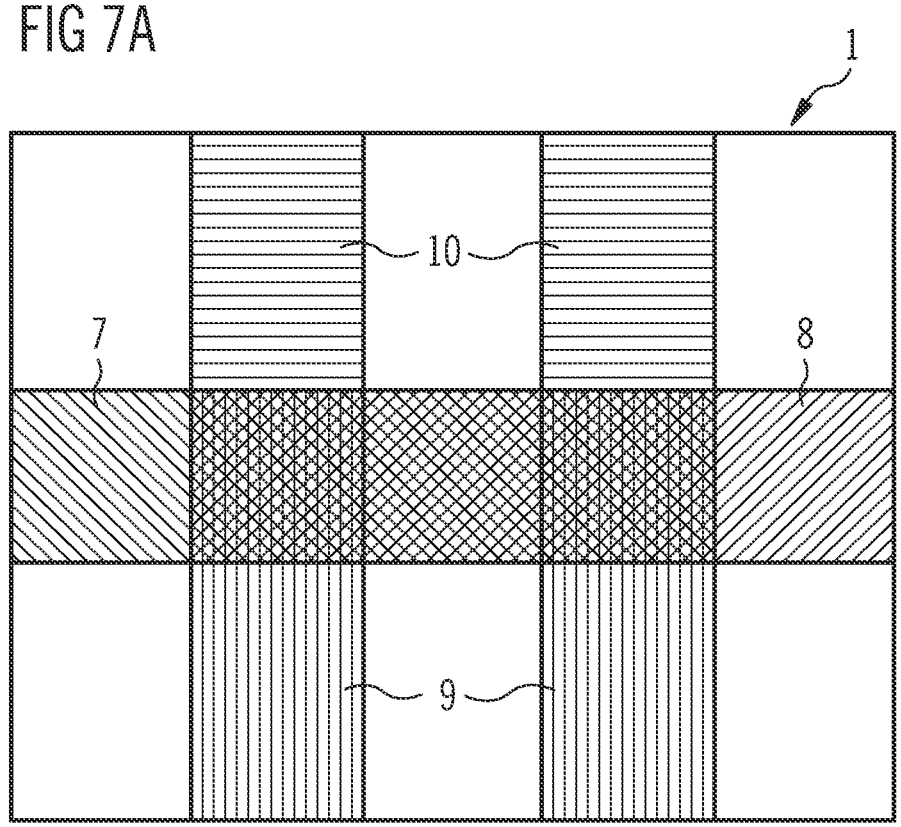
FIG. 7A schematically shows the construction of the internal electrodes of one exemplary embodiment of the electrical multi-layered component comprising eight internal electrodes.

FIG. 7A shows a further embodiment of an electrical multi-layered component, wherein the electrical multi-layered component has a base body 1, in which first and second internal electrodes 7, 8 are arranged, which overlap one another. The embodiment of the electrical multi-layered component according to FIG. 7A exhibits two third internal electrodes 9, which overlap the first 7 and second 8 internal electrodes and delimit electrical functional units. The electrical multi-layered component has two fourth internal electrodes 10, which likewise overlap the first 7 and second 8 internal electrodes and delimit further electrical functional units.

Figure 7B:
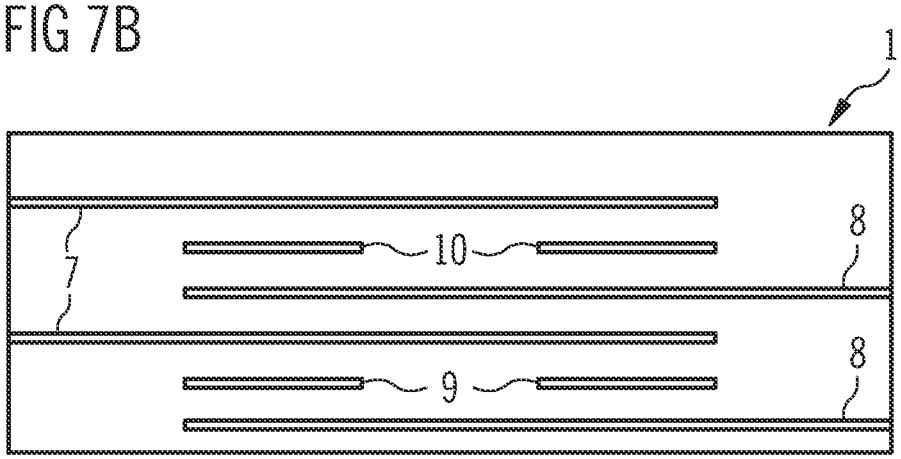
FIG. 7B shows a cross section through an electrical multi-layered component comprising an internal electrode arrangement in accordance with FIG. 7A.

FIG. 7B shows a cross section through an electrical multi-layered component in accordance with the embodiment according to FIG. 7A, wherein the electrical multi-layered component has a plurality of first 7 and a plurality of second 8 internal electrodes. Arranged centrally in the electrical multi-layered component are a first 7 and a second 8 internal electrode, which overlap one another and delimit a first electrical functional unit. Third internal electrodes 9 are arranged between a first 7 and a second 8 internal electrode of the electrical multi-layered component, the third internal electrodes 9 forming together with the first 7 and second 8 internal electrodes in a composite assembly with a ceramic electrical functional units. Furthermore, the electrical multi-layered component has fourth internal electrodes 10, which together with the first 7 and second 8 internal electrodes delimit further electrical functional units. The third 9 and the fourth 10 internal electrodes are each in case arranged in different electrode layers, between a first 7 and a second 8 internal electrode.

The arrangement of the external electrodes in accordance with the exemplary embodiment of the electrical multi-layered component according to FIGS. 7A and 7B can be embodied, for example, in accordance with the embodiment of the arrangement of the external electrodes 6, 6' according to FIG. 5C.

Figure 8A:
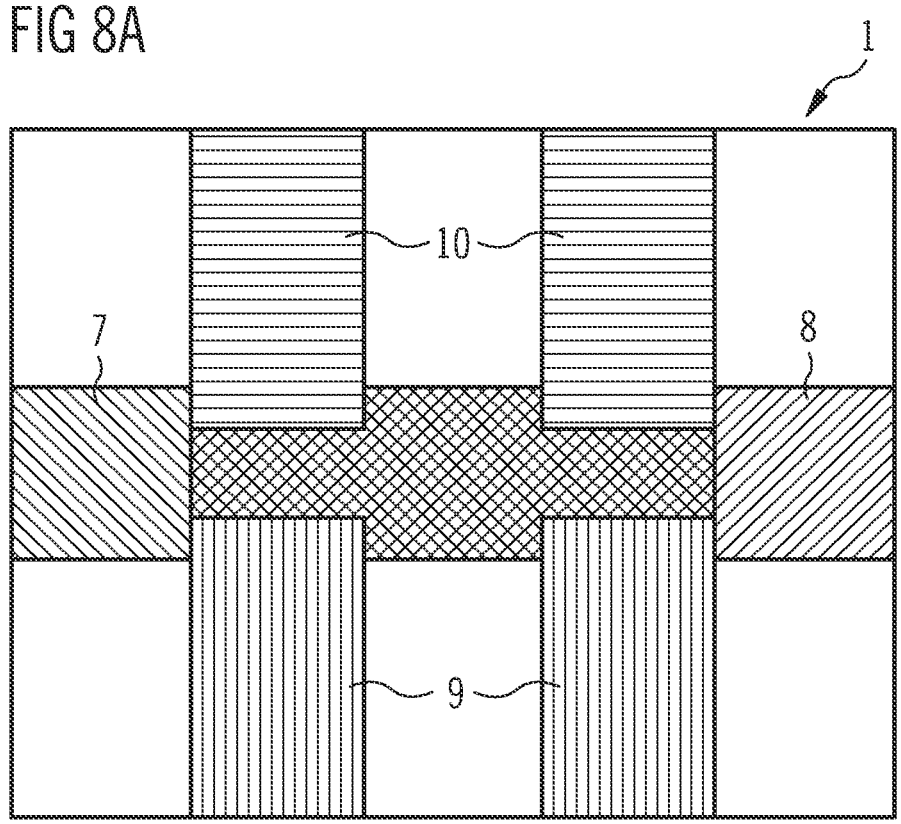
FIG. 8A schematically shows the construction of the internal electrodes of another exemplary embodiment of the electrical multi-layered component comprising eight internal electrodes.

FIG. 8A illustrates a further embodiment of an electrical multi-layered component. The electrical multi-layered component has a base body 1 having first 7 and second 8 internal electrodes, which overlap one another. The electrical multi-layered component furthermore has two third internal electrodes 9 and two fourth internal electrodes 10, which overlap the first 7 and the second 8 internal electrodes and delimit electrical functional units in the overlap region of the internal electrodes 7, 8, 9, 10. The third 9 and fourth 10 internal electrodes are in each case arranged in the same electrode layer of the multi-layered component. The third 9 and fourth 10 internal electrodes are preferably arranged in such a way that they delimit electrical functional units in the overlap region with the first 7 and respectively second 8 internal electrodes, but no electrical functional units are formed between the third 9 and fourth 10 internal electrodes or between two third 9 and respectively two fourth 10 internal electrodes.

Figure 8B:
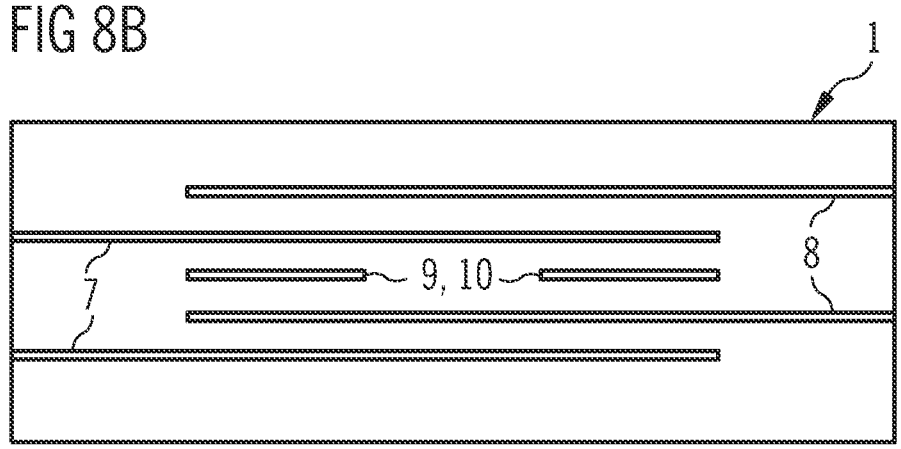
FIG. 8B shows a cross section through an electrical multi-layered component comprising an internal electrode arrangement in accordance with FIG. 8A.

FIG. 8B shows a cross section through an electrical multi-layered component comprising an internal electrode arrangement in accordance with the embodiment according to FIG. 8A. The electrical multi-layered component has two pairs of first 7 and second 8 internal electrodes, wherein two third 9 and two fourth 10 internal electrodes are arranged between the pairs of first 7 and second 8 internal electrodes. The third 9 and fourth 10 internal electrodes are in each case arranged in the same electrode layer of the multi-layered component. The external electrodes of the electrical multi-layered component in accordance with the embodiment according to FIGS. 8A and 8B can be embodied as in FIG. 5C, for example, wherein the first 7 and second 8 internal electrodes are connected to the external electrodes 6 arranged at the end sides and the third 9 and fourth 10 internal electrodes of the electrical multi-layered component are connected to the external electrodes 6' arranged at side surfaces.

FIG. 9A illustrates a further embodiment of an electrical multi-layered component. The electrical multi-layered component according to the embodiment in FIG. 9A has a symmetrical construction, wherein each of the symmetrical sub-units has a first 7 and a second 8 internal electrode and also a plurality of third 9 and respectively fourth 10 internal electrodes. The first 7 and second 8 internal electrodes respectively overlap one another and form in a composite assembly with a ceramic layer in each case a first electrical functional unit. The two first internal electrodes 7 and also the two second internal electrodes 8 are insulated from one another in the electrical multi-layered component and have in each case two separate external electrodes 6. The third 9 and respectively fourth 10 internal electrodes respectively overlap the first 7 and the second 8 internal electrode and delimit further electrical functional units.

FIG. 9B illustrates a cross section through an electrical multi-layered component in accordance with the embodiment according to FIG. 9a. The electrical multi-layered component has in each case two pairs of first 7 and two 8 internal electrodes between which third 9 and respectively fourth 10 internal electrodes are arranged. The third 9 and fourth 10 internal electrodes are arranged in the same electrode layer in the illustrated embodiment of the electrical multi-layered component. In a further embodiment (not illustrated), however, the third 9 and fourth 10 internal electrodes can also be arranged in a plurality of electrode layers.

FIG. 9C shows the arrangement of the external contacts 6, 6' in accordance with the exemplary embodiment of the electrical multi-layered component according to FIGS. 9A and 9B. In this case, the base body 1 of the electrical multi-layered component has in each case two external electrodes 6 arranged at the end sides 4, 4'. The external electrodes 6 arranged at the end sides 4, 4' are respectively connected to the first 7 and second 8 internal electrodes of the electrical multi-layered component. The external electrodes 6' arranged at the side surfaces 5, 5' of the base body 1 are respectively connected to the third 9 and fourth 10 internal electrodes.

Figure 10:
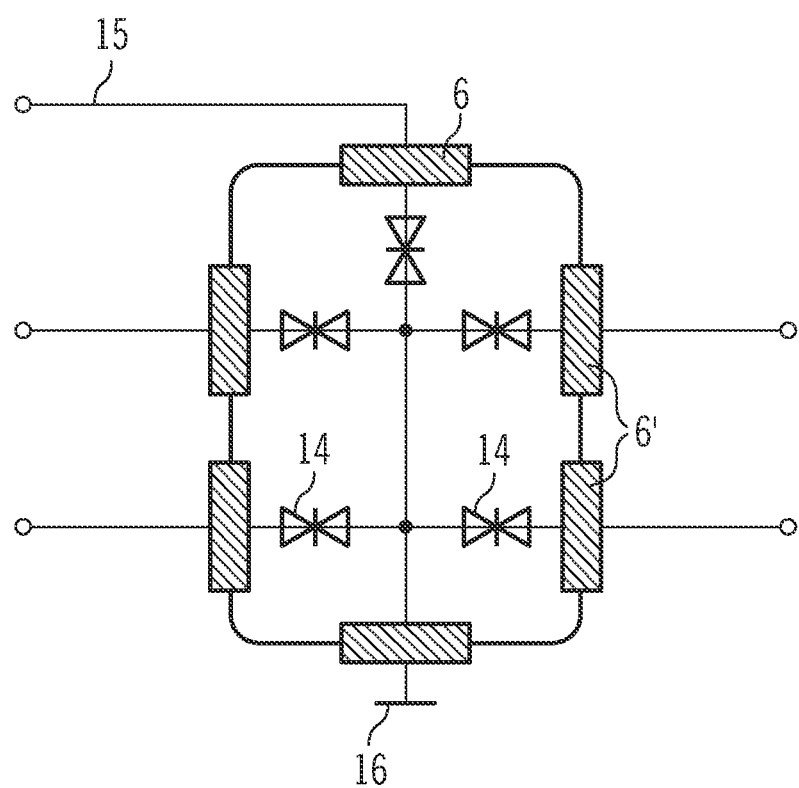
FIG. 10 shows a circuit arrangement of one exemplary embodiment of the electrical multi-layered component comprising a plurality of electrical functional units.

FIG. 10 shows a schematic circuit arrangement of an electrical multi-layered component, wherein the electrical multi-layered component has five electrical functional units in the embodiment illustrated. The electrical functional units are embodied as varistors 14 in the embodiment illustrated. However, it is also possible for the electrical functional units to be embodied as capacitors. Furthermore, the electrical multi-layered component can have both capacitors and varistors. In the embodiment illustrated, the electrical multi-layered component has six external electrodes 6, 6', wherein two external electrodes 6 are arranged at the end sides of the multi-layered component and in each case two external electrodes 6' are arranged at the side surfaces of the multi-layered component. The external electrodes 6 of the electrical multi-layered component which are arranged at the end sides are connected to ground 16 and to a voltage-carrying line 15, respectively. The external electrodes 6' arranged at the side surfaces of the multi-layered component are preferably connected to signal-carrying lines. The order of making contact with the external electrodes 6' at the side surfaces can be chosen as desired, wherein the external electrodes 6 arranged at the end sides are preferably connected to a ground 16 and a voltage-carrying line, respectively.

Although only a restricted number of possible developments of the invention could be described in the exemplary embodiments, the invention is not restricted thereto. It is possible, in principle, for the electrical multi-layered component to have a multiplicity of electrical functional units which are embodied as varistor and/or as capacitor, wherein the arrangement of the functional units, of the internal electrodes and of the external electrodes is preferably embodied symmetrically. A limit is imposed on the number of electrical functional units only by the size of the multi-layered component.

The description of the subjects specified here is not restricted to the individual specific embodiments; rather, the features of the individual embodiments, insofar as is technically expedient, can be combined with one another in any desired manner.

The invention claimed is:

1. An electrical multi-layered component, comprising:
a monolithic base body, comprising a plurality of ceramic layers and electrode layers arranged alternately one above another, wherein the base body has first and second end surfaces lying opposite one another and first and second side surfaces lying opposite one another between the end faces;
a plurality of external electrodes including a first external electrode adjacent the first end surface, a second external electrode adjacent the second end surface, and a third external electrodes adjacent the first side surface; and
a plurality of internal electrodes embodied in the electrode layers, the internal electrodes including a first internal electrode, a second internal electrode and a third internal electrode;
wherein the first internal electrode extends from the first end surface and is electrically coupled to the first external electrode;
wherein the second internal electrode extends from the second end surface and is electrically coupled to the second external electrode;
wherein the third internal electrode extends from the first side surface and is electrically coupled to the third external electrode;
wherein the first internal electrode at least partly overlaps the second internal electrode; and
wherein the third internal electrode at least partly overlaps the first internal electrode and the second internal electrode.

2. The electrical multi-layered component according to claim 1, wherein the first internal electrode and the second internal electrode delimit a first electrical functional unit in an overlap region within which the first and second internal electrodes overlap.

3. The electrical multi-layered component according to claim 2, wherein the third internal electrode in the overlap region with one of the first and second internal electrodes together with a ceramic layer fauns a second electrical functional unit.

4. The electrical multi-layered component according to claim 3, wherein a fourth internal electrode extends from the second side surface and at least partly overlaps one of the first and second internal electrodes.

5. The electrical multi-layered component according to claim 4, wherein the third and fourth internal electrodes are arranged in a same electrode layer.

6. The electrical multi-layered component according to claim 4, wherein the fourth internal is electrically coupled to a fourth external electrode, which is arranged on the second side surface.

7. The electrical multi-layered component according to claim 4, wherein the fourth internal electrode at least partly overlaps the one of the first and second internal electrodes to delimit a third electrical functional unit.

8. The electrical multi-layered component according to claim 1, wherein the plurality of external electrodes comprises precisely n external electrodes, where n is an integer greater than 2 and wherein the component comprises precisely n−1 electrical functional units.

9. The electrical multi-layered component according to claim 1, wherein the plurality of external electrodes comprises precisely n external electrodes, where n is an integer greater than 2 and wherein the component comprises precisely n−2 electrical functional units.

10. The electrical multi-layered component according to claim 1, wherein the component includes an electrical functional unit that has a function of a capacitor or a varistor.

11. The electrical multi-layered component according to claim 10, wherein the component includes a plurality of capacitors having different capacitances.

12. The electrical multi-layered component according to claim 10, wherein the component includes a plurality of varistors having different varistor voltages.

13. The electrical multi-layered component according to claim 1, wherein the ceramic layers comprise a varistor ceramic and/or capacitor ceramic.

14. The electrical multi-layered component according to claim 13, wherein the ceramic layers comprise a varistor ceramic.

15. The electrical multi-layered component according to claim 14, wherein the varistor ceramic comprises ZnO—BiSb or ZnO—Pr.

16. The electrical multi-layered component according to claim 13, wherein the ceramic layers comprise a capacitor ceramic.

17. A circuit arrangement comprising the electrical multi-layered component according to claim 1, wherein the first external electrode is connected to ground.

18. The circuit arrangement according to claim 17, wherein the second external electrode is connected to a voltage-carrying line.

19. An electrical multi-layered component, comprising:
- a monolithic base body, comprising a plurality of ceramic layers, wherein the base body has first and second end surfaces lying opposite one another and first and second side surfaces lying opposite one another between the end surfaces;
- a first internal electrode within the base body, the first internal electrode extending from the first end surface;
- a second internal electrode within the base body, the second internal electrode extending from the first end surface and at least partially overlapping the first internal electrode; and
- a third internal electrode within the base body, the third internal electrode extending from the first end surface and at least partially overlapping the first and second internal electrodes.

* * * * *

UNITED STATES PATENT AND TRADEMARK OFFICE
CERTIFICATE OF CORRECTION

PATENT NO.          : 8,693,164 B2
APPLICATION NO.     : 13/139166
DATED               : April 8, 2014
INVENTOR(S)         : Thomas Feichtinger It is certified that error appears in the above-identified patent and that said Letters Patent is hereby corrected as shown below:

In the Claims:

In Col. 10, line 28, claim 3, delete "fauns" and insert --forms--.

Signed and Sealed this
Tenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,693,164 B2  Page 1 of 1
APPLICATION NO. : 13/139166
DATED : April 8, 2014
INVENTOR(S) : Feichtinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 257 days.

Signed and Sealed this

Twenty-ninth Day of September, 2015

Michelle K. Lee
*Director of the United States Patent and Trademark Office*